United States Patent
Byun et al.

(10) Patent No.: US 11,431,277 B2
(45) Date of Patent: Aug. 30, 2022

(54) TEMPERATURE ESTIMATION OF STEP MOTOR BASED ON SENSING VOLTAGE THEREOF

(71) Applicant: Hewlett-Packard Development Company, L.P., Spring, TX (US)

(72) Inventors: Ji-Young Byun, Seongnam-si (KR); Yong-Ho You, Seongnam-si (KR); Hyoungil Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/269,073

(22) PCT Filed: Aug. 12, 2019

(86) PCT No.: PCT/US2019/046118
§ 371 (c)(1),
(2) Date: Feb. 17, 2021

(87) PCT Pub. No.: WO2020/055531
PCT Pub. Date: Mar. 19, 2020

(65) Prior Publication Data
US 2021/0175838 A1 Jun. 10, 2021

(30) Foreign Application Priority Data
Sep. 10, 2018 (KR) .......... 10-2018-0107612

(51) Int. Cl.
*H02P 29/66* (2016.01)
*G03G 15/00* (2006.01)
*H02P 8/36* (2006.01)
*H04N 1/23* (2006.01)

(52) U.S. Cl.
CPC ......... *H02P 29/66* (2016.02); *G03G 15/5004* (2013.01); *H02P 8/36* (2013.01); *H04N 1/2346* (2013.01)

(58) Field of Classification Search
CPC ........................................... H02P 29/66
USPC .......................................... 358/1.9
See application file for complete search history.

(56) References Cited

U.S. PATENT DOCUMENTS

| 4,897,584 A | 1/1990 | Grutzmacher et al. |
| 2005/0258158 A1 | 11/2005 | Takami et al. |
| 2014/0168704 A1 | 6/2014 | Hasegawa |

(Continued)

FOREIGN PATENT DOCUMENTS

| EP | 0714781 A2 | 6/1996 |
| EP | 2802071 A1 | 11/2014 |

(Continued)

*Primary Examiner* — Jacky X Zheng
(74) *Attorney, Agent, or Firm* — Jefferson IP Law, LLP (57) ABSTRACT

An image forming apparatus and an image forming method are provided. The image forming apparatus includes a printing engine to form an image, a step motor to drive the printing engine, a driving circuit to provide a constant current to the step motor and sense a voltage corresponding to a magnitude of the constant current provided to the step motor, and a processor to calculate a temperature of the step motor based on the voltage sensed by the driving circuit during an excitation period of the step motor and control an operation of the image forming apparatus based on the calculated temperature.

19 Claims, 11 Drawing Sheets

(56) References Cited

U.S. PATENT DOCUMENTS

| | | | | |
|---|---|---|---|---|
| 2014/0333250 | A1* | 11/2014 | You | H02P 8/38 |
| | | | | 318/696 |
| 2017/0108806 | A1* | 4/2017 | Song | G03G 15/80 |
| 2017/0343959 | A1* | 11/2017 | Choi | G03G 15/2039 |
| 2018/0203409 | A1* | 7/2018 | Choi | G03G 15/2039 |
| 2019/0157998 | A1* | 5/2019 | Takada | H02P 8/34 |

FOREIGN PATENT DOCUMENTS

| | | |
|---|---|---|
| JP | 05-278935 A | 10/1993 |
| JP | 06-026953 A | 2/1994 |
| JP | 11-98895 A | 4/1999 |
| JP | 11-167316 A | 6/1999 |
| JP | 2011-259525 A | 12/2011 |
| JP | 2015-139232 A | 7/2015 |
| JP | 2017-184464 A | 10/2017 |
| WO | WO-2019059486 A1 | 3/2019 |

* cited by examiner

TEMPERATURE ESTIMATION OF STEP MOTOR BASED ON SENSING VOLTAGE THEREOF

BACKGROUND

An image forming apparatus is an apparatus for printing print data generated by a print control terminal device on printing paper. Representative examples include a printer, a copier, a facsimile, a scanner, or a multifunction printer that integrally implements these functions.

An image forming apparatus may be equipped with a motor capable of performing various functions such as conveying printing paper, driving a printing engine, etc.

BRIEF DESCRIPTION OF THE DRAWINGS

Certain examples of the present disclosure will be more apparent from the following description taken in conjunction with the accompanying drawings, in which.

Throughout the drawings, it should be noted that like reference numbers are used to depict the same or similar elements, features, parts, components, and structures.

DETAILED DESCRIPTION

Hereinafter, various examples of the present disclosure will be described with reference to the accompanying drawings. The examples to be described below may also be modified in various forms. In order to more clearly describe features of the examples, a detailed description of matters which are well known to those to skilled in the art to which the examples pertain will be omitted.

In the present specification, a case in which a component is "connected" with another component includes a case in which the component is 'directly connected' to the other component and a case in which the component is 'connected to the other component while having another component interposed therebetween'. In addition, a case in which any component "comprises" another component means that any component may further comprise other components, and not exclude other components, unless explicitly described to the contrary.

The expression "image forming job" as used herein may refer to various jobs related with an image, such as, formation of image or generation/storage/transmission of an image file (e.g., printing, copying, scanning, or faxing), and the expression "job" as used herein may refer to not only the image forming job, but also a series of processes required for performance of the image forming job.

In addition, an "image forming device" refers to a device for printing print data generated from a terminal such as a computer on a recoding paper. Examples of the image forming device described above may include a copier, a printer, a facsimile, a scanner, a multi-function printer (MFP) that complexly implements functions thereof through a single device, and the like. The image forming device may mean any device capable of performing an image forming task, such as the printer, the copier, the scanner, the fax machine, the multi-function printer (MFP), or a display.

The expression "printing data" as used herein may refer to data converted into format that can be printed at the printer. If the printer supports direct printing, the file itself may be the printing data.

The expression "user" as used herein may refer to a person who performs a manipulation related with the image forming job using the image forming apparatus or a device connected to the image forming apparatus in a wired or wireless manner. Further, the expression "manager" as used herein may refer to a person who has an authority to access all the functions and systems of the image forming apparatus. The "manager" and the "user" may refer to the same person.

Figure 1:
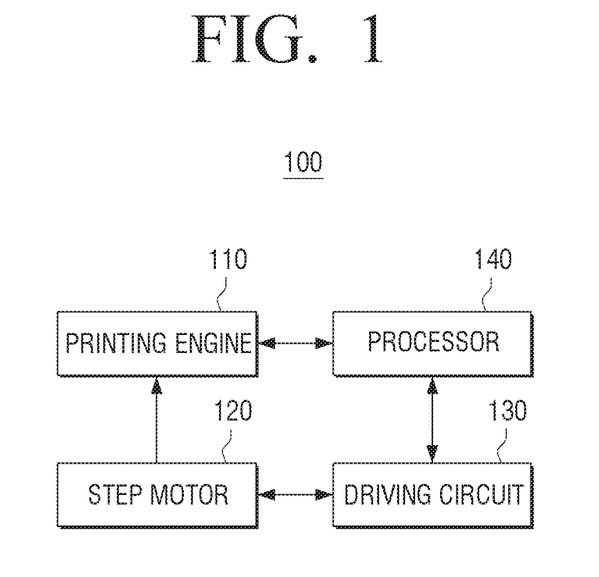
FIG. 1 is a schematic block diagram of an image forming apparatus according to an example.

FIG. 1 is a schematic block diagram of an image forming apparatus according to an example.

Referring to FIG. 1, an image forming apparatus 100 may include a printing engine 110, a step motor 120, a driving circuit 130, and a processor 140.

The printing engine 110 may perform an image forming job. As an example, the printing engine 110 may perform an image forming job under the control of the processor 140 or by the operation of the step motor 120. An example configuration of the printing engine 110 will be described below with reference to FIG. 3.

The step motor 120 may be provided in the image forming apparatus 100 and may receive a pulse input and a driving power to perform a constant-speed drive or an acceleration drive according to the pulse input. The step motor 120 may perform a forward drive or a reverse drive according to the phase sequence of the pulse input. The step motor 120 may start the operation of the printing engine 110. For example, the step motor 120 may be a motor capable of performing various functions such as driving an organic photo conductor (OPC) drum, operating a fuser, conveying paper, or the like.

The driving circuit 130 may generate a driving signal for the step motor 120 according to a driving command. The driving circuit 130 may provide a predetermined constant current to the step motor 120. As an example, the driving circuit 130 may receive a driving command (e.g., current magnitude information and speed information), provide a constant current to the step motor 120 corresponding to the received current magnitude information, and provide an impulse driving signal corresponding to the speed information to the step motor 120.

The driving circuit 130 may sense a voltage corresponding to the magnitude of a constant current provided to the step motor 120. As an example, the driving circuit 130 may include a driving driver for sensing the magnitude of the constant current provided to the step motor 120 by using a sensing resistance, and sense a voltage corresponding to the magnitude of the constant current provided to the step motor 120 (e.g., a voltage value of a sensing resistance, hereinafter, referred to as a sensing voltage) by using the sensing voltage. The driving driver may receive a feedback of the magnitude of the constant current provided to the step motor 120 based on the voltage value of the sensing resistance.

The voltage magnitude of the sensing resistance may be proportional to the temperature of the step motor 120 and the temperature of the step motor 120 may be estimated based on the voltage magnitude of the sensing resistance. An example of a correlation between the voltage of the sensing resistance and the temperature of the step motor 120 will be described with reference to FIG. 8.

The driving circuit 130 may perform signal processing and output the sensed voltage. As an example, the driving circuit 130 may perform low-pass filtering of the sensed voltage and amplify the low-pass filtered voltage value to output the amplified voltage value to the processor 140. An example configuration and operation of the driving circuit 130 will be described with reference to FIG. 4.

The processor 140 may control each constituent element of the image forming apparatus 100. Based on a printing command being received, the processor 140 may control the operation of the printing engine 110 so that printing data corresponding to the received printing command may be printed, and may transmit a driving command for the step motor 120, which starts the operation of the printing engine 110, to the driving circuit 130. For example, the processor 140 may provide a current reference value (Vref) (hereinafter, referred to as a control value of a constant current) to the driving circuit 130 as a driving command so that a predetermined constant current may be provided to the step motor 120. The constant current control value may be expressed by a pulse width modulation (PWM) signal form.

The processor 140 may receive the magnitude information of the sensing voltage sensed by the driving circuit 130. The processor 140 may calculate the temperature of the step motor 120 based on the magnitude of the voltage transferred through an analog to digital converter (ADC) port (or a terminal).

In order to periodically estimate the temperature of the step motor 120, the processor 140 may control the driving circuit 130 so that a constant current may be provided to the step motor 120 in a predetermined period of time even if the step motor 120 is not driven.

The processor 140 may control the operation of the image forming apparatus based on the calculated temperature of the step motor 120. The processor 140 may determine whether the calculated temperature of the step motor is within a normal range, and if the temperature is not within the normal range, may perform the limited printing operation or may not perform the printing operation.

For example, if the calculated temperature is within a predetermined first temperature section, the processor 140 may perform a printing job requested in a normal mode. Further, if the calculated temperature is within a second temperature section that is higher than the predetermined first temperature section, the processor 140 may perform a job requested in a stress mode.

In an example, if the calculated temperature is not within the predetermined first temperature section and not within the second temperature section, that is, the calculated temperature is lower than the predetermined first temperature section or higher than the second temperature section, the processor 140 may not perform a requested printing job. The predetermined first temperature section may be between 0° C. and 60° C. and the second temperature section may be between 60° C. and 80° C. Of course, these temperature sections are exemplary and the present disclosure is not limited thereto.

The stress mode may be a mode for limiting the function of the image forming apparatus 100 and performing a printing job. Whether to enter the stress mode may be determined based on the temperature of the step motor 120 or determined by the size of the user's print job. For example, when the temperature of the step motor 120 is low, and the size of the user's print job is 100 pages or more, the processor 140 may determine the operation mode of the image forming apparatus 100 as the stress mode.

As described above, when entering the stress mode, the processor 140 may reduce the printing speed of the image forming apparatus 100. For example, in an image forming apparatus that is capable of printing 14 pages per minute (ppm), the processor 140 may perform a printing job at a printing speed of 14 ppm at a normal temperature, and in the stress mode, perform a printing job at a printing speed of 7 ppm, which is lower than 14 ppm. The printing speed in the stress mode may be set by a function of the image forming apparatus and based on the application environment.

When entering the stress mode, the processor 140 may modify a reference range of the number of consecutive prints. As an example, at a relatively high temperature, image quality may be deteriorated by a smaller number of consecutive prints than those at the normal temperature.

For example, when a reference value of the number of consecutive prints at the normal temperature is 100, the number of prints in the second temperature section may be changed to 50. However, such figure is exemplary, and could be modified by the function and the arrangement environment of the image forming apparatus.

According to an example, it is illustrated and described that the image forming apparatus has only one stress mode, but at the time of implementation, the temperature range may be specifically divided such that the image forming apparatus may have a plurality of stress modes.

The processor 140 may determine the development condition corresponding to the calculated temperature and control the printing engine 110 so that a printing job requested based on the determined development condition may be performed. As an example, the development operation may be affected by the internal temperature in the image forming apparatus 100. Before a printing job in which the step motor generates heat, or when a predetermined period of time passes after a printing job is performed, the temperature of the step motor 120 may be the same as the temperature of the image forming apparatus 100. Thus, the processor 140 may determine the development condition corresponding to the calculated temperature and control the printing engine 110 based thereon. According to an example, it is described that only the development condition is variable, but at the time of implementation, other conditions in a series of processes of a printing operation, such as a fixation condition, a charging condition, etc. may be determined based on the calculated temperature.

Referring to FIG. 1, it is described that the step motor 120 and the driving circuit 130 are separated, but at the time of implementation, the step motor 120 may be included in the driving circuit 130.

While only a simple configuration of the image forming apparatus has been described, various configurations may be additionally provided at the time of implementation. An example of additional configurations will be described below with reference to FIG. 2.

Figure 2:
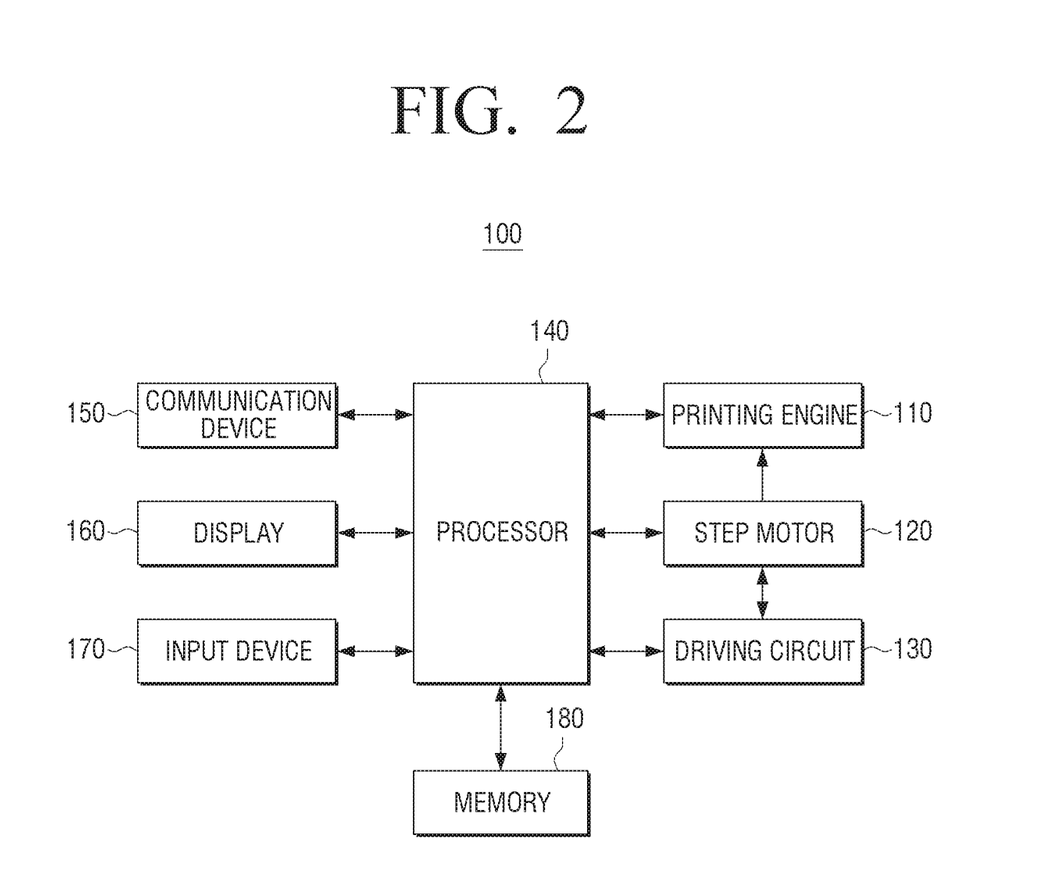
FIG. 2 is a more detailed block diagram of an image forming apparatus according to an example.

FIG. 2 is a more detailed block diagram of an image forming apparatus according to an example.

Referring to FIG. 2, an image forming apparatus 100 may include a printing engine 110, a step motor 120, a driving circuit 130, a processor 140, a communication device 150, a display 160, an input device 170, and a memory 180.

The printing engine 110, the step motor 120 and the driving circuit 130 have been descried with reference to FIG. 1, and thus repeated description will be omitted. The processor 140 has been also described with reference to FIG. 1, and thus the repeated description of FIG. 1 will be omitted and the description of the configurations added to FIG. 2 will be made.

The communication device 150 may be connected to a printing control terminal device (not shown), and may receive printing data from the printing control terminal device. The communication device 150 may be formed for connecting the image forming apparatus 100 to an external device and be connected to a terminal device through not only a Local Area Network (LAN) or an Internet network but also a Universal Serial Bus (USB) port or a wireless communication (e.g., WiFi 802.11a/b/g/n, NFC, and Bluetooth) port. The printing control terminal device may be a general personal computer (PC), a notebook, a mobile device such as a smart phone, or the like.

The communication 150 may receive printing data from the printing control terminal device. When the image forming apparatus 100 has a scanning function, the communication device 150 may transmit the generated scan data to the printing control terminal device or an external server (not shown).

The display 160 may display various information provided by the image forming apparatus 100. The display 160 may display the operation state of the image forming apparatus 100 or display a user interface window for selecting a user selectable function and option.

The display 160 may display the operation state of the image forming apparatus 100. For example, when the image forming apparatus 100 operates in a stress mode, the display 160 may display that the image forming apparatus operates at a low printing speed due to the high temperature of the image forming apparatus 100, or, when the temperature of the step motor 120 is out of the first and second temperature sections, display that a printing operation cannot be performed.

The input device 170 may include a plurality of function keys for a user to set or select various functions supported by the image forming apparatus 100. The input device 170 may be embodied as a mouse, a keyboard, etc. or a touch screen for simultaneously performing the functions of the display 160. The user may input various driving commands for the image forming apparatus 100.

The memory 180 may store printing data. As an example, the memory 180 may store the printing data received from the communication device 150. The memory 180 may be implemented not only as a storage medium in the image forming apparatus 100, but also as an external storage medium, a removable disk including a USB memory, a web server via a network, or the like.

The memory 180 may store look-up data, such as a look-up table, for controlling the step motor 120. The look-up table may be an acceleration table including pulse period information for each driving speed of the step motor 120, may be a speed (or acceleration) table corresponding to a plurality of load voltages (Vload), a look-up table for torque values corresponding to a plurality of load voltages (Vload), a look-up table for a constant current control value (Vref value, or a control voltage value) corresponding to a plurality of load voltages (Vload), or the like. The acceleration table may be a table having pulse period information for each driving speed of the step motor 120.

The memory 180 may store information on a temperature range for entering a stress mode, operation information of the image forming apparatus 100 in a stress mode, information on the development condition for each sensed temperature, or the like.

The memory 180 may store temperature information of the step motor 120 corresponding to the voltage value sensed by the ADC port. As an example, the memory 180 may store formula information for calculating the temperature information.

The processor 140, based on printing data being received from the communication device 150, may determine the operation mode of the image forming apparatus 100 according to the size of the received printing data (e.g., number of copies) and the temperature of the step motor 120.

The processor 140 may control the printing engine 110 so that the printing data received according to the determined operation mode may be printed. When the determined operation mode is a stress mode, the processor 140 may control the display 160 to display a message notifying that the printing speed is limited.

When the calculated temperature is out of the first and second temperature sections, the processor 140 may control the display 160 to display a message notifying that the printing operation cannot be performed, or control the communication device 150 so that information corresponding to the message may be transmitted to the printing control terminal device from which the printing data was received.

When the temperature at the step motor 120 reaches a temperature at which the printing job is possible after the printing data is received, the processor 140 may control the printing engine 110 to print the printing data, which was not printed beforehand.

As described above, the image forming apparatus 100 may determine a temperature of a step motor based on a voltage value of a sensing resistance. Therefore, even without a temperature sensor, the printing job may be performed stably. In addition, since the image forming apparatus 100 performs a printing job by varying the development condition with the determined temperature, it is possible to output a high-quality image even with a temperature change. Further, the image forming apparatus 100 may not need to enter a stress mode in a low temperature environment, and a motor step-out due to a torque decrease of a motor caused by a high temperature environment and a continuous printing job may be prevented in advance. Thus, the printing function may be improved without additional cost.

Referring to FIGS. 1 and 2, it has been described that a single driving circuit controls a single step motor, but at the time of implementation, a single driving circuit may control a plurality of step motors, and a step motor alongside a brushless direct current (BLDC) motor or a DC motor.

Referring to FIGS. 1 and 2, it has been described that the step motor 120 is separated from the printing engine or the driving circuit, but at the time of implementation, the step motor may be included in the printing engine, or in the driving circuit.

In the above examples, it has been described that a temperature of a step motor is determined based on a voltage value of a sensing resistance. However, at the time of implementation, the temperature of the step motor may be used as an internal temperature of the image forming apparatus 100. As an example, the temperature of the step motor before performing a printing job or when a predetermined time passes after performing a printing job may be the same as the internal temperature of the image forming apparatus. The temperature of the step motor at this point of time may be used as the temperature in the image forming apparatus.

Figure 3:
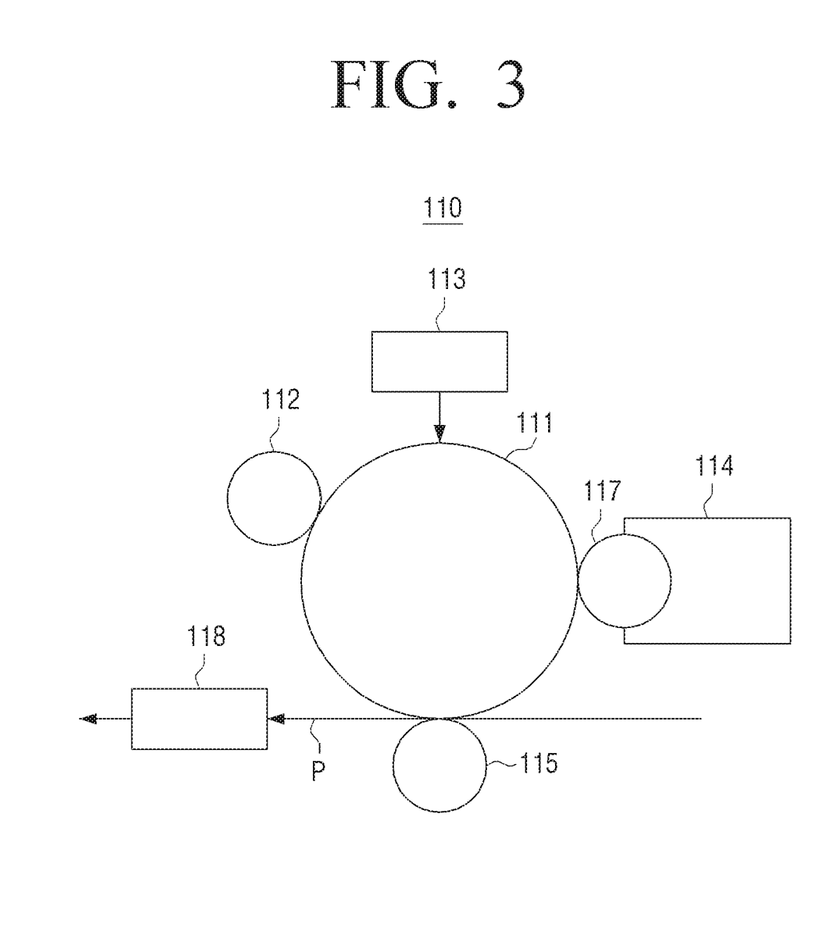
FIG. 3 is a view illustrating a printing engine according to an example.

FIG. 3 is a view illustrating a printing engine according to an example.

Referring to FIG. 3, a printing engine 110 may include a photoconductive drum 111, a charger 112, an exposure device 113, a developing device 114, a transfer device 115, and a fixing device 118. The printing engine 110 may further include a feeding means (not shown) which supplies a recording medium P.

In an example, an electrostatic latent image may be formed on the photoconductive drum 111. The photoconductive drum 111 may be referred to as an image forming medium, a photoconductive drum, a photoconductive belt, etc. depending on its form.

The configuration of the print engine 110 corresponding to only one color will be described and illustrated for convenience of explanation. However, in implementation, the print engine 110 may further include a plurality of photoconductive drums 111, a plurality of chargers 112, a plurality of exposure devices 113, a plurality of developing devices 114 and an intermediate transfer belt (not shown) corresponding to a plurality of colors.

The charger 112 may charge the surface of the photoconductive drum 111 to a uniform potential. The charger 112 may be implemented in the form of a corona charger, a charging roller, a charging brush, or the like.

The exposure device 113 may form an electrostatic latent image on the surface of the photoconductive drum 111 by changing a surface potential of the photoconductive drum 111 according to image information to be printed. For example, the exposure device 113 may form an electrostatic latent image by irradiating light modulated according to the image information to be printed to the photosensitive drum 111. The exposure device 113 of this type may be referred to as a light scanning device or the like. In an example, a light emitting diode (LED) may be used as a light source of the exposure device 113.

The developing device 114 may include a developer therein and supply the developer to the electrostatic latent image to develop the electrostatic latent image into a visible image. The developing device 114 may include a developing roller 117 which supplies the developer to the electrostatic latent image. For example, the developer may be supplied from the developing roller 117 to an electrostatic latent image formed in the photoconductive drum 111 by a developing electric field formed between the developing roller 117 and the photoconductive drum 111.

The visible image formed in the photosensitive drum 111 may be transferred to the recording medium P by the transfer device 115 or the intermediate transfer belt (not shown). The transfer device 115 may transfer a visible image to the recording medium P by using, for example, an electrostatic transfer method. The visible image may be attached to the recording medium P by electrostatic attraction.

The fixing device 118 may fix a visible image on the recording medium P by applying heat or pressure to the visible image on the recording medium P. A printing job may be completed by this series of processes.

The developer may be used every time an image forming job is performed and run out when used longer than a predetermined time. In this case, a unit for storing the developer (e.g., the developing device 114 itself) may need to be replaced. A component or a constituent element that can be replaced by the user of the image forming apparatus may be referred to as a consumable or replaceable unit (CRU). A CRU memory (e.g., a CRUM chip) may be attached to the consumable unit for appropriately managing the consumable unit.

The step motor 120 may rotate each constituent element of the printing engine 110. In an example, a plurality of constituent elements of the printing engine 110 may be simultaneously driven by a single step motor 120 or a plurality of motors being combined with one another.

Although a configuration directly related to image forming has been described and illustrated, the printing engine 110 may further include a paper transmission device (not shown) that transfers paper loaded in a load try to a transferring machine and a fixing machine.

Figure 4:
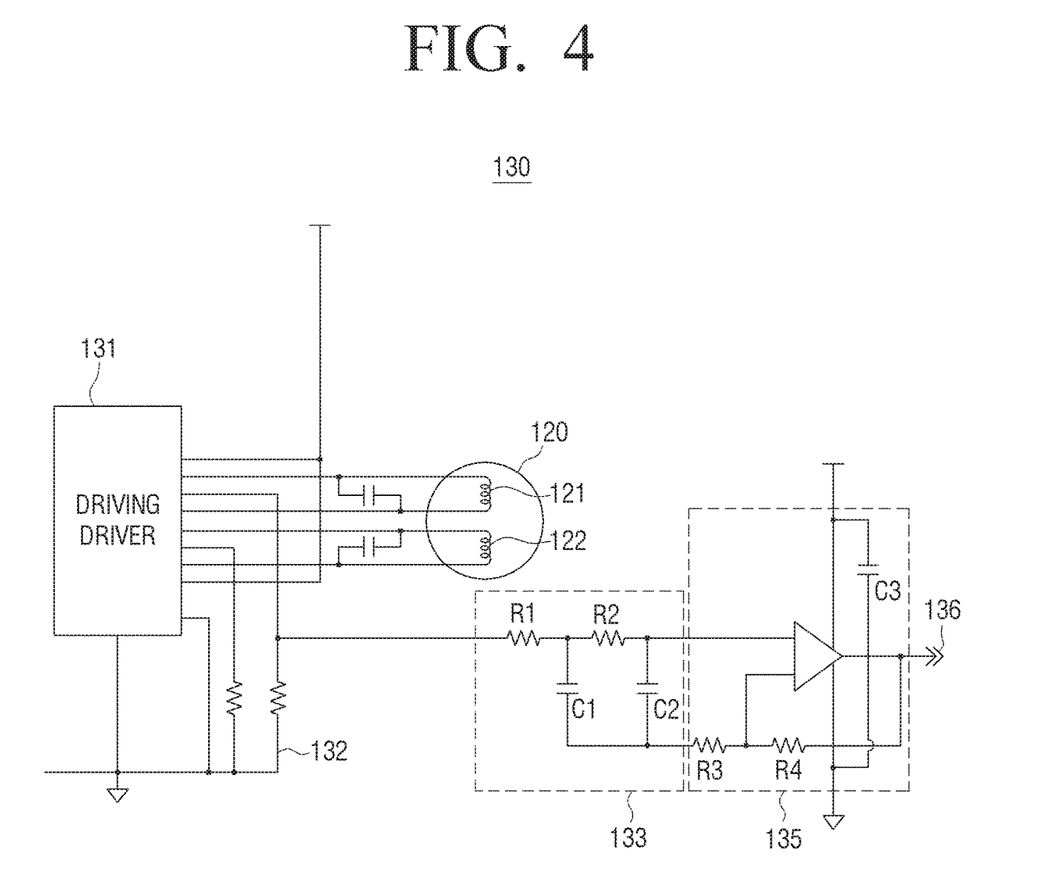
FIG. 4 is a view illustrating a circuit diagram of a driving circuit according to an example.

FIG. 4 is a view illustrating a circuit diagram of a driving circuit according to an example.

Referring to FIG. 4, a driving circuit 130 may consist of a driving driver 131, a sensing resistance 132, a filtering circuit 133, and an amplification circuit 135.

The driving driver 131 may provide a constant current to the step motor 120. The driving driver 131 may be provided with a constant current control value (Vref), and a pulse value corresponding to a driving speed from the processor 140. The driving driver 131 may provide a constant current to the step motor 120 based on the received constant current control value (Vref) and a voltage value (Vsens) corresponding to a current value flowing through the step motor 120 based on the sensing resistance 132.

The driving driver 131 may periodically provide a constant current at a time when the step motor 120 is not required to drive as well as a time when the step motor 120 needs to drive in order to periodically estimate the temperature of the step motor 120.

The driving driver 131 may generate respective pulse signals for coils (e.g., 121, 122) of the step motor 120 based on the received pulse value, and provide the generated pulse signals to the step motor 120.

The sensing resistance 132 may be a resistance for sensing the magnitude of a current which flows through a single coil (e.g., 121 or 122) of the step motor 120.

Because the sensing resistance 132 may not output a constant value, the voltage value of the sensing resistance 132 may be smoothed by using the filtering circuit 133, an example of which is described below.

The filtering circuit 133 may perform low pass filtering of the voltage of the sensing resistance 132. The filtering circuit 133 may be an RC smoothing circuit consisting of a plurality of resistances (R1 and R2) and a plurality of capacitors (C1 and C2). Referring to FIG. 4, the filtering circuit 133 has been embodied by connecting two RC circuits in series. However, it is to be understood that this is merely an example and in implementation, only a single RC smoothing circuit may be used. In a further example, another smoothing circuit may be used other than the RC smoothing circuit for implementing the filtering circuit.

When the smoothed voltage value does not satisfy the ADC level of the processor 140, the smoothed voltage value may be amplified by using the amplification circuit 135 which amplifies a voltage value at a predetermined ratio.

When the smoothed voltage value satisfies the ADC level to be measured, the amplification circuit 135 to be described below may be omitted.

The amplification circuit 135 may amplify an output value of the filtering circuit 133. The amplification circuit 135 may consist of operational amplifier (op-amp) and a plurality of resistances R3 and R4.

The voltage value output through the amplification circuit 135 may be provided to an output port 136 of the amplification circuit 135 and input to an ADC port of the processor 140. In an example, the processor 140 may monitor load fluctuation in real time.

Figure 9:
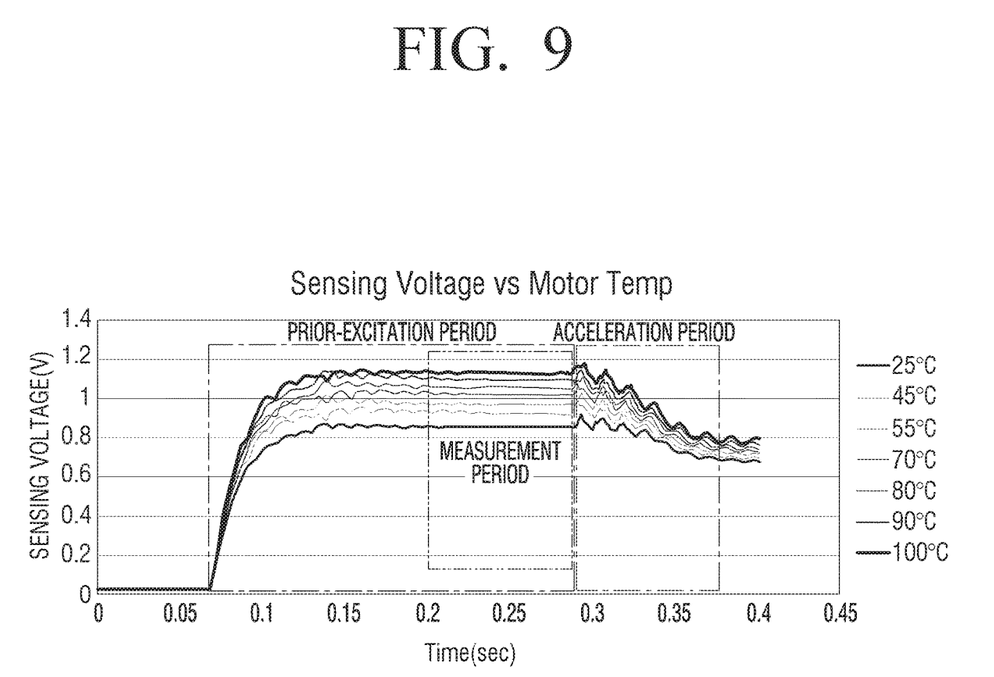
FIG. 9 is a view illustrating a sensing voltage during an excitation period according to a temperature change according to an example.

As will be described below, the voltage value of the sensing resistance 132 may not have a constant value when the step motor drives as shown in FIG. 9 but may have a constant value during an excitation period. The processor 140 may sense the voltage value of the sensing resistance 132 during an excitation period of the step motor 120. The excitation period may be a period during which the coil (e.g., 121 or 122) of the step motor 120 is supplied with a constant current but the step motor is not driven and may be one of a prior-excitation period, a post-excitation period, and a holding period.

Hereinafter, a correlation of the temperature of the step motor and the voltage value of the sensing resistance 132 will be described with reference to FIGS. 5 to 9.

Figure 5:
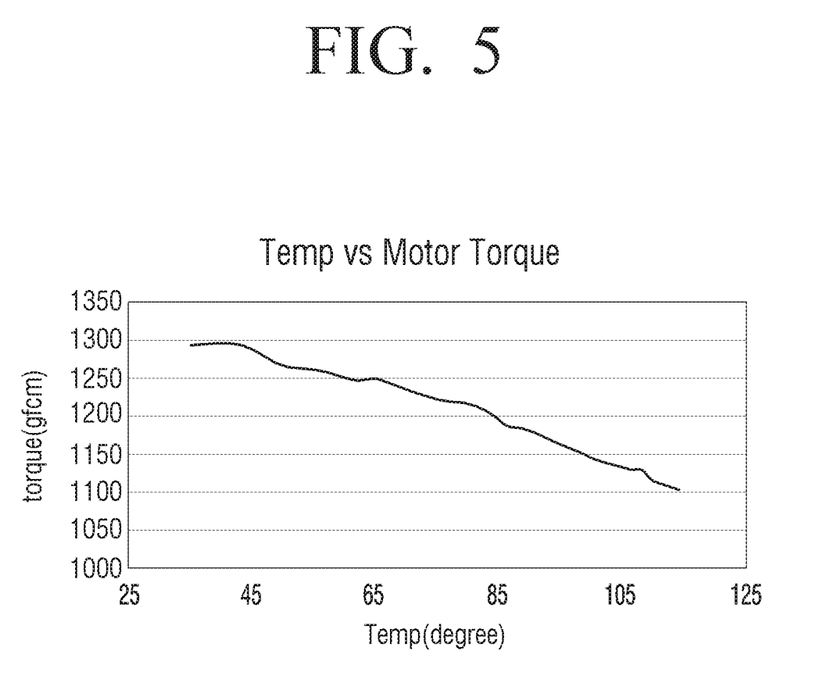
FIG. 5 is a view to explain a relationship between a temperature and a torque of a step motor according to an example.

FIG. 5 is a view to explain a relationship between a temperature and a torque of a step motor according to an example.

Referring to FIG. 5, a torque of a step motor may be reduced as a temperature of the step motor increases.

If the torque of the step motor falls below a predetermined torque required for a printing job, a step-out may occur, so that a normal image forming job may become difficult. Therefore, in order to prevent a step-out phenomenon, a torque margin may be ensured by setting a current greater than a necessary motor driving torque by more than at least 30% to 50%. However, the setting of the overcurrent may cause vibration and heat generation to the step motor.

Therefore, if the step motor continuously drives, the temperature of the step motor may gradually increase.

However, as described above, when the step motor continuously drives and the temperature of the step motor increases, referring to FIG. 5, the torque of the step motor may be reduced, and thus there is high likelihood that a step-out occurs.

The image forming apparatus 100 may not perform printing through a stress mode when out of a normal operation mode, or may perform an operation such as limiting the number of consecutive prints that can be processed at once.

However, if the temperature of the image forming apparatus is not known, it is necessary to determine whether the operation should be performed in the stress mode based on only the number of consecutive prints. However, when the image forming apparatus 100 is reset after continuous output is proceeded, the counter of the number of consecutive prints may be also reset, so that the image forming apparatus may perform in the normal mode even in a case where it is required to operate in the stress mode.

Hereinafter, a method for estimating the temperature without using a temperature sensor will be described with reference to FIGS. 6 to 9.

Figure 6:
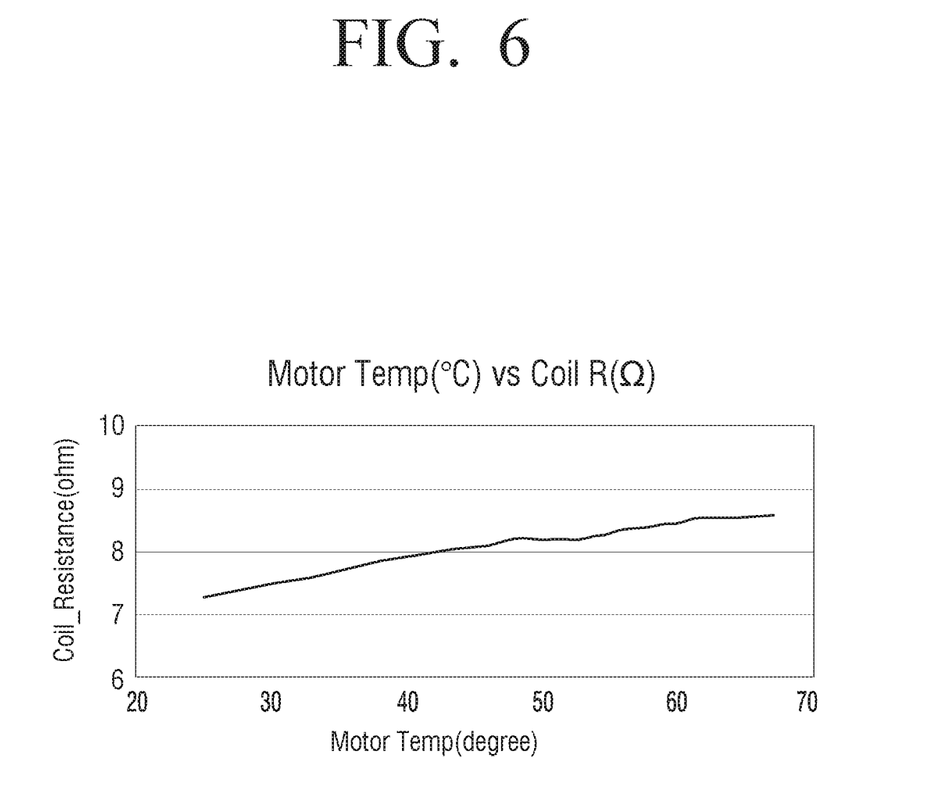
FIG. 6 is a view to explain a relationship between a temperature and a coil resistance in a step motor according to an example.
Figure 7:
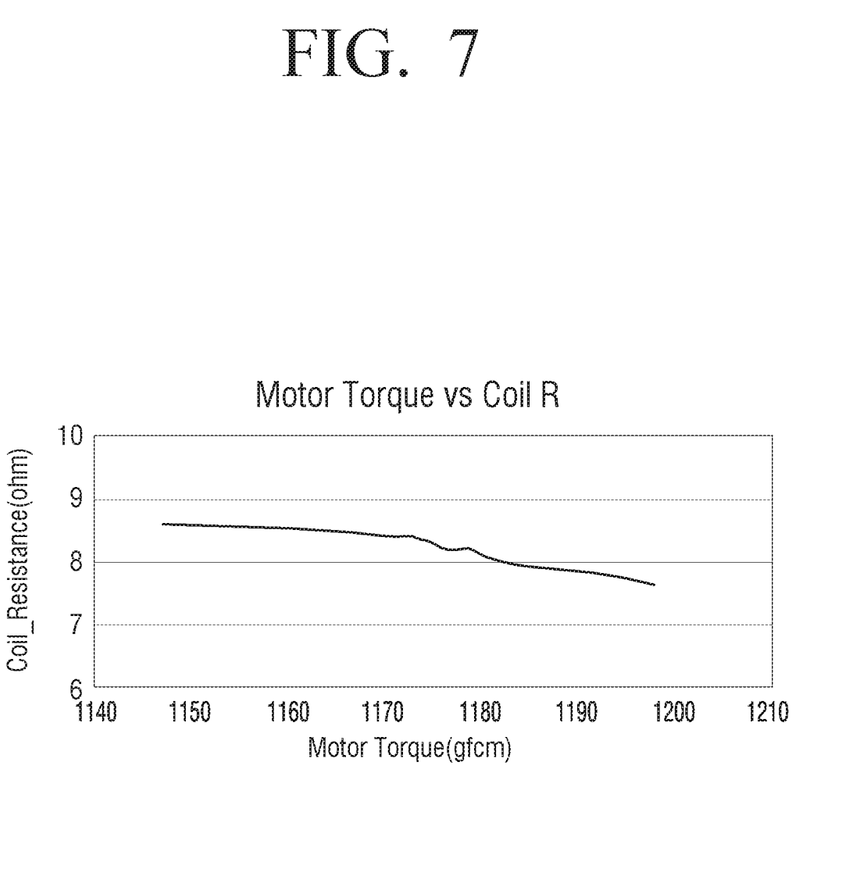
FIG. 7 is a view to explain a relationship between a torque of a step motor and a coil resistance according to an example.

FIG. 6 is a view to explain a relationship between a temperature and a coil resistance in a step motor according to an example, and FIG. 7 is a view to explain a relationship between a torque of a step motor and a coil resistance according to an example.

Referring to FIG. 6, as a temperature of a step motor increases, a resistance value of a coil in the step motor may increase proportionally.

Referring to FIG. 7, as a resistance of the coil is reduced, a torque of the step motor may proportionally decrease.

Referring to FIGS. 6 and 7, given that the resistance value of the coil of the step motor is affected by a temperature, the resistance value of the coil may be used for estimating the temperature of the step motor.

Considering the equation $R=V/I$, a resistance value may be calculated based on a voltage value or a current value which is applied to a coil. Since a constant current is provided to the step motor under the control of the processor, a constant current value may be estimated, and a V value may be a voltage value of a sensor resistance. As an example, a driving driver may provide a current in proportion to the constant current provided to the step motor to the sensing resistance in order to provide an appropriate constant current to the step motor. The voltage value of the sensing value may be proportional to a resistance value of a coil as shown in FIG. 8 below.

Figure 8:
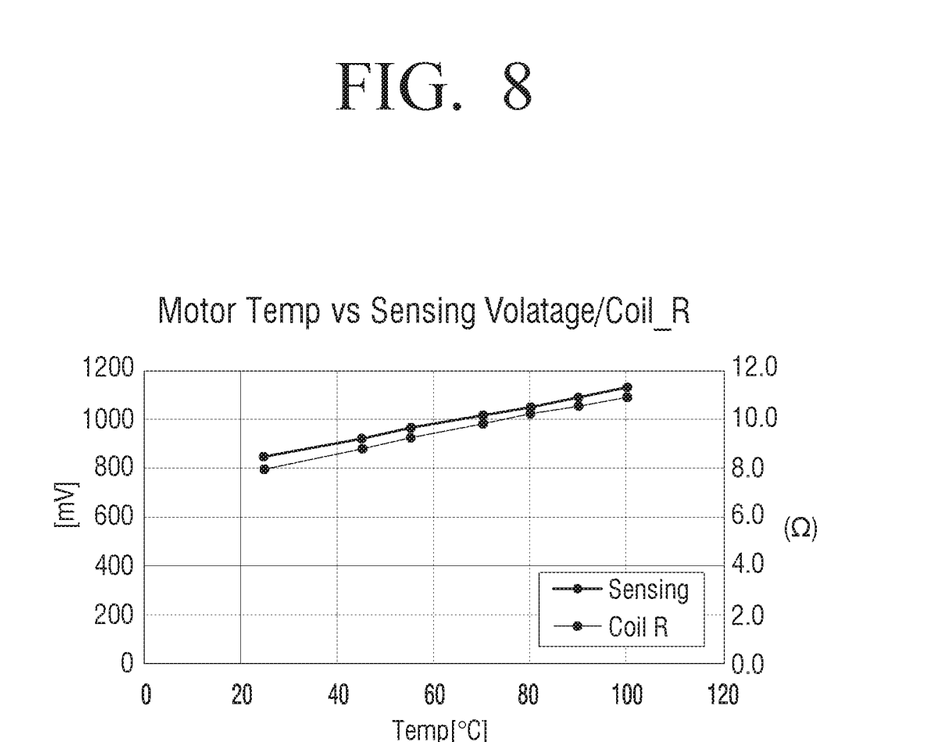
FIG. 8 is a view to explain a relationship between a temperature and a sensing voltage and a relationship between a temperature and a coil resistance according to an example.

FIG. 8 is a view to explain a relationship between a temperature and a sensing voltage and a relationship between a temperature and a coil resistance according to an example.

Referring to FIG. 8, a resistance value of a coil may change in proportion to a temperature of a step motor, and a voltage of a sensing resistance may similarly change in proportion to a temperature of a step motor. In other words, it is possible to estimate the temperature of the step motor by directly calculating the resistance of the coil, or by using the voltage value of the sensing resistance.

Given that the voltage of the sensing resistance and the temperature of the step motor are proportional, the temperature of the step motor may be estimated by using the voltage value of the sensing resistance. However, it is difficult to measure the resistance of the coil since a counter-electromotive force component flows in at the time of driving the step motor. Therefore, the voltage of the sensing resistance may be estimated when the counter-electromotive force component does not flow in. An example operation will be described with reference to FIG. 9.

FIG. 9 is a view illustrating a sensing voltage during an excitation period according to a temperature change according to an example.

Referring to FIG. 9, a sensing voltage may have a different value according to the operation state of the step motor even when the same constant current is provided.

However, as described above, a relatively constant value may be obtained during a prior-excitation period. The prior-excitation period may be an area where a current is applied to the step motor before the step motor drives and the rotation does not occur. Since the actual motor rotation occurs in an acceleration section and a constant-speed section, it is difficult to accurately calculate a motor coil resistance by a sensing voltage due to the inflow of the counter-electromotive force component.

Therefore, the motor rotation may not occur during the prior-excitation period, the post-excitation period, and the holding period. The voltage of the sensing resistance may be estimated in the section where the current is applied to the motor and the temperature of the step motor may be estimated by using the measured voltage.

Figure 10:
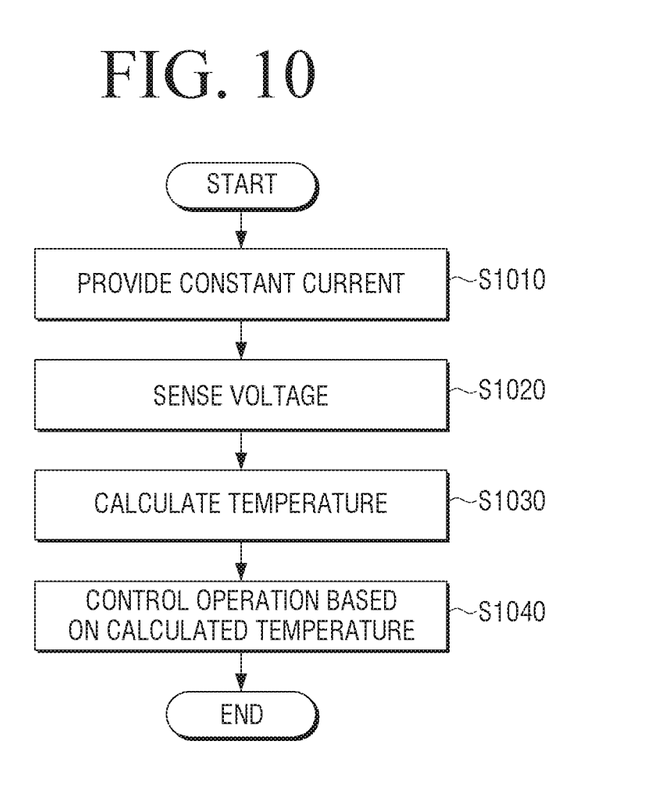
FIG. 10 is a flowchart of an image forming method according to an example.

FIG. 10 is a flowchart to explain an image forming method according to an example.

Referring to FIG. 10, a constant current may be provided to a step motor at operation S1010. A constant current may be provided to a step motor in a predetermined period of time to estimate a temperature not only when the motor is required to drive, but also when the motor is not required to drive.

A voltage corresponding to the magnitude of the constant current provided to the step motor may be sensed at operation S1020. A voltage of a sensing resistance for sensing the magnitude of the constant current provided to the step motor may be sensed. The resistance value of the sensing resistance may change in proportion to the resistance value change of the coil in the step motor.

The temperature of the step motor may be calculated based on a voltage value sensed by a driving circuit during an excitation period of the step motor at operation S1030. The excitation period may be any one of a prior-excitation period, a post-excitation period, and a holding period.

The operation of the image forming apparatus may be controlled based on the calculated temperature at operation S1040. When the calculated temperature is within a predetermined first temperature section, a printing job requested in a normal mode may be performed, and when the calculated temperature is within a second temperature section higher than the predetermined first temperature section, the requested printing job may be performed in a stress mode in which at least one of the number of consecutive prints and the printing speed is reduced. If the calculated temperature is lower than the predetermined first temperature section or higher than the second temperature section, the requested printing job may not be performed.

A development condition corresponding to the calculated temperature may be determined, and a printing job may be performed based on the determined development condition.

Figure 11:
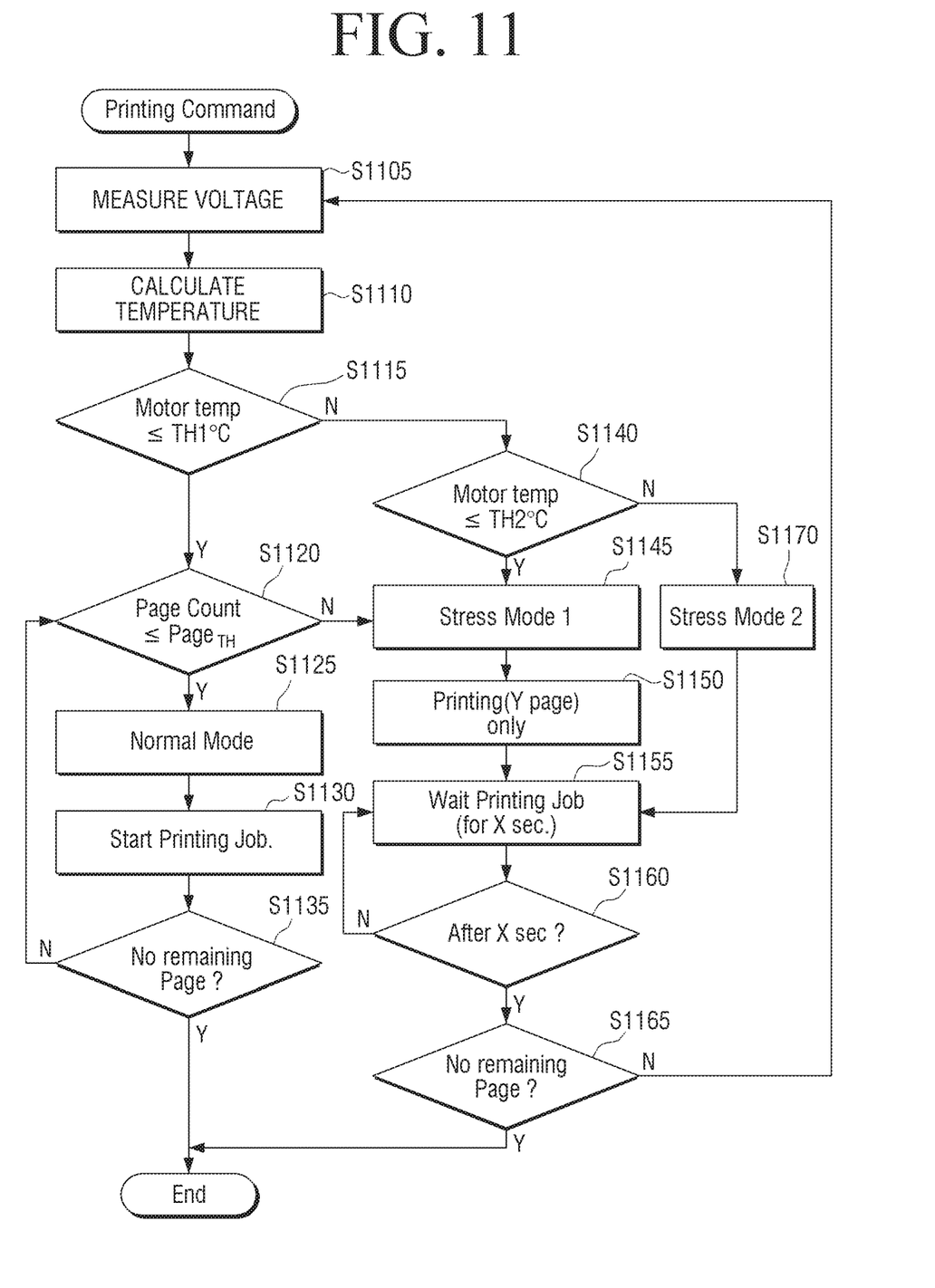
FIG. 11 illustrates a method of a control operation according to an example.

FIG. 11 illustrates a method of a control operation according to an example.

Referring to FIG. 11, based on a printing command being received, as described in FIG. 10, a voltage value of a sensing resistance may be measured at operation S1105, and a temperature may be calculated based on the measured voltage value at operation S1110.

If the calculated temperature is lower than a predetermined first temperature at operation S1115-Y, the number of consecutive prints may be checked at operation S1120. The first temperature may be 60° C., but the present disclosure is not limited thereto.

When the number of consecutive prints is smaller than a predetermined number at operation S1120-Y, a mode may be determined as a normal mode at operation S1125, and a printing job may be performed in the normal mode at operation S1130. The predetermined number of consecutive prints may be 100, but the present disclosure is not limited thereto. In the normal mode, a printing job may be normally performed up to the predetermined number of consecutive prints (page$_{TH}$: 100 sheets, for example).

If there is a subsequent printing job during the printing job at operation S1135-N, the process may return to the determination operation, and if there is no subsequent printing job at operation S1135-Y, the process may be terminated.

If the calculated temperature is not lower than the predetermined first temperature at operation S1115-N, it can be confirmed whether the calculated temperature is lower than a predetermined second temperature at operation S1140. The predetermined second temperature may be 80° C., but the present disclosure is not limited thereto.

If the calculated temperature is lower than the predetermined second temperature or if there are more printing job requests than a preset number at operation S1140-Y, the image forming apparatus may enter a first stress mode at operation S1145.

When entering the first stress mode, after performing a printing job as many as the number of consecutive prints (e.g., 5) available in the first stress mode at operation S1150, driving of the motor may be stopped for a predetermined period of time (e.g., 10 seconds) at operation S1155.

When a predetermined period of time passes at operation S1160, whether a printing job needs to be continued may be checked at operation S1165, and if a printing job remains, the image forming apparatus may return to an operation to estimate the temperature of the step motor.

When the calculated temperature is not lower than the predetermined second temperature at operation S1140-N, the image forming apparatus may enter the second stress mode at operation S1170. When entering the second stress mode, the image forming apparatus may be in a standby mode for a predetermined time (e.g., 10 seconds) without a printing job at operations S1155 and S1160, and return to the operation for estimating the temperature of the step motor again.

As described above, an image forming apparatus using the methods of FIGS. 10 and 11 may sense a temperature of a step motor (a temperature in the image forming apparatus) based on a voltage value of a sensing resistance. Therefore, the image forming apparatus may perform a printing job more stably than an image forming apparatus without a temperature sensor. In addition, since the image forming apparatus 100 varies the development condition with the sensed temperature and performs a printing job, it is possible to output a high-quality image even with a temperature change. In addition, there is no need to enter an unnecessary stress mode in a low temperature environment, and a motor step-out due to the torque decrease of the motor caused by a high temperature environment and the continuous printing job may be prevented in advance. As a result, the printing function may be enhanced without additional costs.

The above-described image forming method may be embodied as a program and provided to an image forming apparatus. The program including the image forming method may be stored in a non-transitory computer readable medium.

The non-transitory computer readable recording medium may refer to a medium that stores data and that can be read by devices. The aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although examples have been shown and described, it will be appreciated by those skilled in the art that changes may be made to these examples without departing from the principles and spirit of the present disclosure. Accordingly, the scope of the present invention is not construed as being limited to the described examples, but is defined by the appended claims as well as equivalents thereto.

What is claimed is:
1. An image forming apparatus, comprising:
a printing engine to form an image;
a step motor to drive the printing engine;
a driving circuit to:
provide a constant current to the step motor, and
sense a voltage corresponding to a magnitude of the constant current provided to the step motor; and a processor to:
   calculate a temperature of the step motor based on the voltage sensed by the driving circuit during an excitation period of the step motor, and
   control an operation of the image forming apparatus based on the calculated temperature.

2. The image forming apparatus as claimed in claim 1, wherein the excitation period is at least one of a prior-excitation period, a post-excitation period, or a holding period.

3. The image forming apparatus as claimed in claim 1, wherein the processor:
   performs a printing job requested in a normal mode based on the calculated temperature being within a predetermined first temperature section, and
   performs a printing job requested in a stress mode in which at least one of a number of consecutive prints and a printing speed is reduced based on the calculated temperature being within a second temperature section higher than the predetermined first temperature section.

4. The image forming apparatus as claimed in claim 3, wherein the processor does not perform a requested printing job based on the calculated temperature being lower than the predetermined first temperature section or higher than the second temperature section.

5. The image forming apparatus as claimed in claim 1, wherein the processor:
   determines a development condition corresponding to the calculated temperature, and
   controls the printing engine to perform a printing job request based on the determined development condition.

6. The image forming apparatus as claimed in claim 1, wherein the driving circuit comprises:
   a driving driver to provide a constant current to the step motor;
   a sensing resistance to sense a magnitude of the constant current;
   a filtering circuit to perform low pass filtering of a voltage of the sensing resistance; and
   an amplification circuit to amplify an output value of the filtering circuit and provide the amplified output value to the processor.

7. The image forming apparatus as claimed in claim 6, wherein the voltage of the sensing resistance changes in proportion to a resistance change of a coil in the step motor.

8. The image forming apparatus as claimed in claim 1, wherein the processor controls the driving circuit to provide a constant current to the step motor in a predetermined period of time to estimate a temperature of the step motor in the predetermined period of time.

9. The image forming apparatus as claimed in claim 1, wherein the driving circuit comprises a sensing resistance to sense a magnitude of the constant current.

10. The image forming apparatus as claimed in claim 9, wherein the sensing resistance is to sense a magnitude of a current that flows through a single coil of the step motor.

11. The image forming apparatus as claimed in claim 10, wherein the driving circuit comprises a filtering circuit to filter a voltage of the sensing resistance.

12. The image forming apparatus as claimed in claim 11, wherein the driving circuit comprises an amplification circuit to amplify an output value of the filtering circuit and provide the amplified output value to the processor.

13. An image forming method, the method comprising:
   providing a constant current to a step motor;
   sensing a voltage corresponding to a magnitude of the constant current provided to the step motor;
   calculating a temperature of the step motor based on a voltage sensed by a driving circuit during an excitation period of the step motor; and
   controlling an operation of an image forming apparatus based on the calculated temperature.

14. The method as claimed in claim 13, wherein the excitation period is at least one of a prior-excitation period, a post-excitation period, or a holding period.

15. The method as claimed in claim 13, wherein the controlling comprises:
   based on the calculated temperature being within a predetermined first temperature section, performing a printing job requested in a normal mode; and
   based on the calculated temperature being within a second temperature section higher than the predetermined first temperature section, performing a printing job requested in a stress mode in which at least one of a number of consecutive prints and a printing speed decreases.

16. The method as claimed in claim 15, wherein the controlling comprises not performing a requested printing job based on the calculated temperature being lower than the predetermined first temperature section or higher than the second temperature section.

17. The method as claimed in claim 13, wherein the controlling comprises:
   determining a development condition corresponding to the calculated temperature; and
   controlling the image forming apparatus to perform a printing job based on the determined development condition.

18. The method as claimed in claim 13, wherein the sensing of the voltage comprises:
   sensing a voltage of a sensing resistance to sense a magnitude of the constant current provided to the step motor,
   wherein the voltage of the sensing resistance changes in proportion to a resistance change of a coil in the step motor.

19. The method as claimed in claim 13, wherein the providing of the constant current comprises providing a constant current to the step motor in a predetermined period of time.

* * * * *